(12) United States Patent
Cromie et al.

(10) Patent No.: US 9,902,480 B1
(45) Date of Patent: Feb. 27, 2018

(54) ANTI-TILT ASSEMBLY FOR BALLOONS

(71) Applicant: X Development LLC, Mountain View, CA (US)

(72) Inventors: John Cromie, Menlo Park, CA (US); Gopal Ravi, San Jose, CA (US)

(73) Assignee: X Development LLC, Mountain View, CA (US)

( * ) Notice: Subject to any disclaimer, the term of this patent is extended or adjusted under 35 U.S.C. 154(b) by 261 days.

(21) Appl. No.: 14/960,789

(22) Filed: Dec. 7, 2015

(51) Int. Cl.
 B64B 1/40 (2006.01)

(52) U.S. Cl.
 CPC ..................................... B64B 1/40 (2013.01)

(58) Field of Classification Search
 CPC ...... B64B 1/22; B64B 1/38; B64B 1/40–1/70; B66C 13/06; B66C 13/08; B64G 1/00; B64G 1/12
 USPC ................. 244/31–33; 212/274; 294/67.5, 74
 See application file for complete search history.

(56) References Cited

U.S. PATENT DOCUMENTS

| | | | | |
|---|---|---|---|---|
| 287,458 A * | 10/1883 | Olmsted | ................... | B61B 5/02 104/22 |
| 870,430 A | 11/1907 | Herve | | |
| 1,359,689 A * | 11/1920 | Gammeter | ............... | B64D 1/02 244/140 |
| 1,553,340 A * | 9/1925 | Upson | ...................... | B64B 1/40 244/31 |
| 2,728,540 A * | 12/1955 | Ebneter | ..................... | B64B 1/40 244/127 |
| 3,327,666 A * | 6/1967 | Hedges | ................... | B63B 22/00 114/265 |
| 4,619,422 A | 10/1986 | Petrehn | | |
| 4,883,184 A * | 11/1989 | Albus | ..................... | B66C 13/06 212/195 |
| 5,507,596 A * | 4/1996 | Bostelman | .............. | B63B 38/00 166/355 |
| 5,765,703 A * | 6/1998 | Shiwaku | ................. | B66C 13/06 212/274 |
| 5,775,640 A * | 7/1998 | Gobbi | ..................... | B64B 1/005 244/115 |
| 8,157,205 B2 * | 4/2012 | McWhirk | ................. | B64B 1/02 244/30 |
| 2006/0214053 A1 * | 9/2006 | Hase | ........................ | B64B 1/50 244/33 |
| 2014/0124616 A1 | 5/2014 | Greco et al. | | |

* cited by examiner

Primary Examiner — Marc R Burgess
(74) Attorney, Agent, or Firm — Lerner, David, Littenberg, Krumholz & Mentlik, LLP

(57) ABSTRACT

Aspects of the disclosure provide anti-tilt assemblies for reducing the strain of an air ballast when used to change the direction of a high altitude balloon. For instance, in one example, a balloon includes a balloon envelope having an air ballast and a plurality of support tendons and a payload assembly. The balloon also includes an anti-tilt assembly arranged between the balloon envelope and the payload assembly. The anti-tilt assembly includes a support structure having a plurality of line connections arranged at a top end of the support structure and a connection member at a bottom end of the support structure. The connection member is attached to the payload assembly. The anti-tilt assembly also includes a plurality of support lines connected at to one of the support tendons and to the connection member. In addition, each support line is arranged to pass through a corresponding one of the line connections.

19 Claims, 10 Drawing Sheets

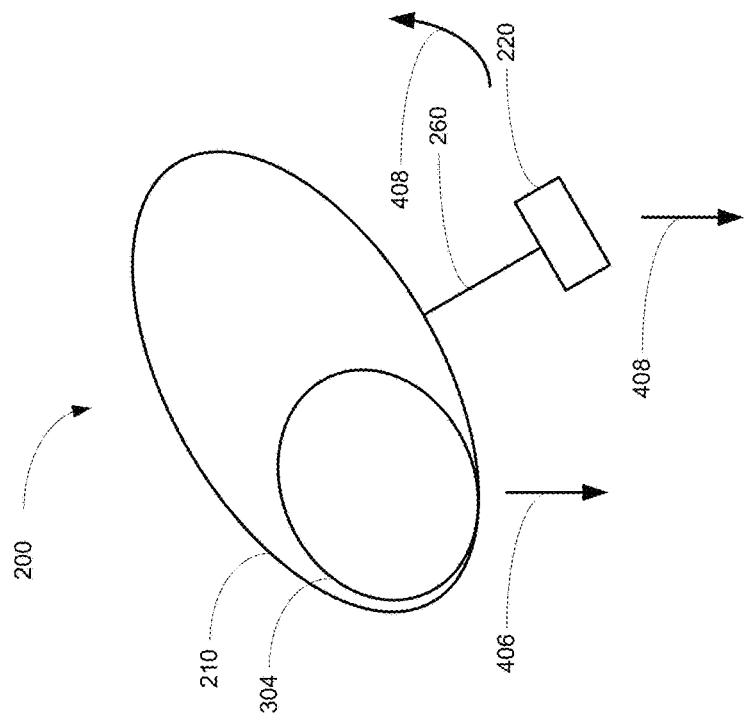
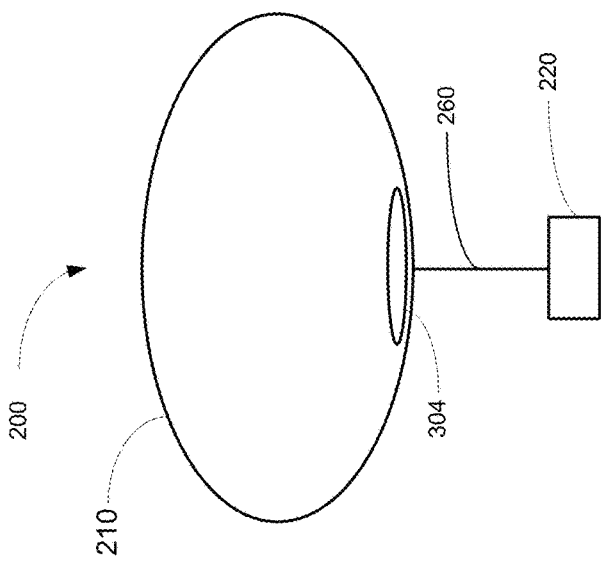

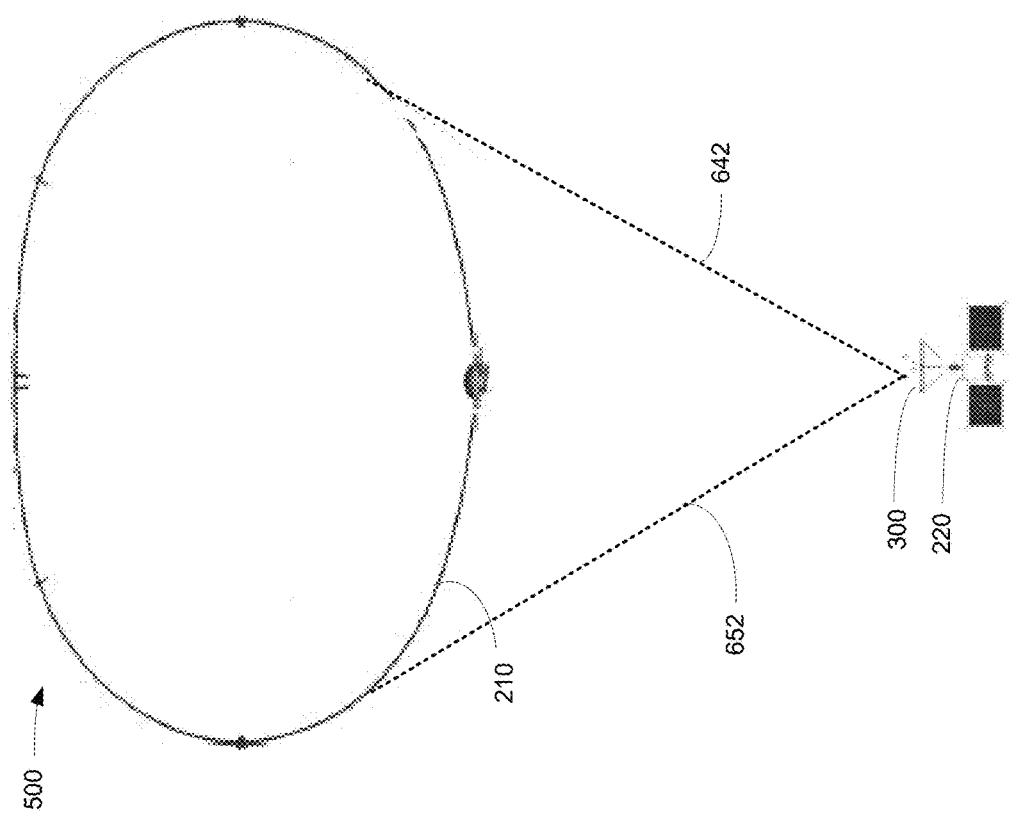
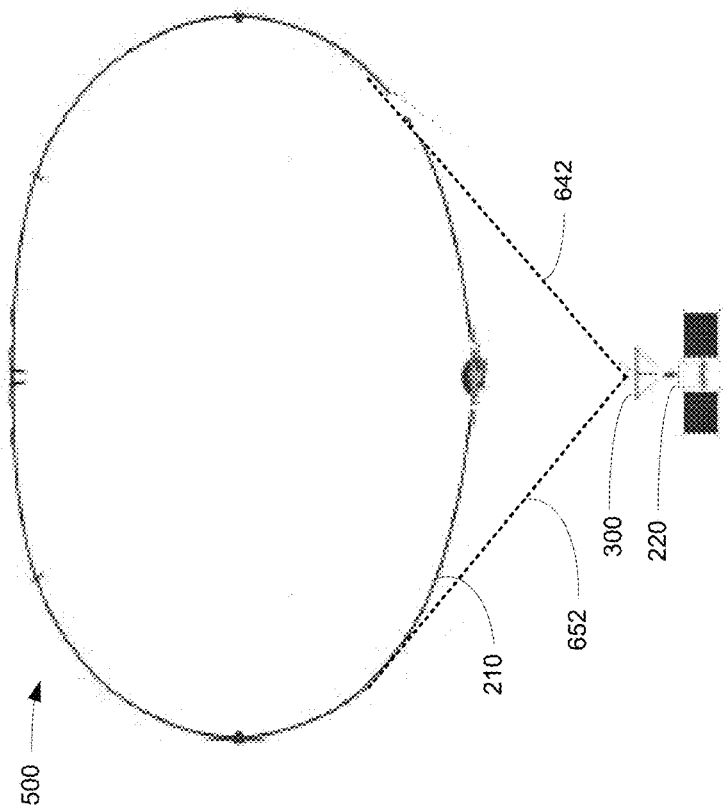
FIGURE 9D
FIGURE 9C

ANTI-TILT ASSEMBLY FOR BALLOONS

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. For instance, during flight, these balloons may use changes in altitude to achieve navigational direction changes. As an example, a balloon may pump air into a bladder within the envelope which causes a shift in the center of gravity of the balloon, which in turn, causes the envelope to tilt to one side. In some examples, this tilt can be up to 60 degrees from vertical.

BRIEF SUMMARY

Aspects of the present disclosure are advantageous for high altitude balloon systems. For instance, one aspect of the disclosure provides a balloon. The balloon includes a balloon envelope having an air ballast and a plurality of support tendons, a payload assembly, and an anti-tilt assembly arranged between the balloon envelope and the payload assembly. The anti-tilt assembly includes a support structure having a plurality of line connections arranged at a top end of the support structure and a connection member at a bottom end of the support structure, the connection member being attached to the payload assembly. The anti-tilt assembly also includes a plurality of support lines, each support line of the plurality of support lines being connected at a first end to one of the plurality of support tendons and at a second end to the connection member and being further arranged to pass through a corresponding one of the plurality of line connections.

In one example, the support structure includes at least six elongated support members arranged in a tetrahedron. In another example, the top end is a triangle formed from three elongated support members. In this example, exactly two line connections are located at each of three corners of the triangle. In addition, there are exactly six line connections in the plurality of line connections and exactly six support lines. In addition or alternatively, the support lines are spaced apart from one another around the circumference of the balloon and no two adjacent support lines around the circumference of the balloon pass through line connections located at a same corner of the three corners of the triangle.

In another example, exactly one of the plurality of support lines is threaded through an opening in the corresponding line connection. In another example, the support structure and the support lines are arranged relative to the balloon envelope in order to counteract a tilting motion of the balloon envelope caused by the air ballast being filled with gas. In this example, the plurality of support lines are attached at different attachment points around a circumference of the balloon such that when the air ballast is filled with air and causes the balloon envelope to tilt, at least one of the plurality of support structures allows the payload to pull against the balloon envelope and resist the tilting motion.

In another example, the plurality of support lines and the plurality of support tendons are comprised of a same material. In another example, the plurality of support lines have diameters smaller than diameters of the plurality of support tendons. In another example, the connection member includes a spool configured to hold the plurality of support lines prior to launch of the balloon. In another example, the connection member includes a corresponding spool for each of the plurality of support lines such that each corresponding spool is configured to hold a given one of the plurality of support lines prior to launch of the balloon. In another example, the support structure is comprised of a set of elongated support members and the connection member includes a bracket having three attachment regions at which three corresponding elongated support members of the set of elongated support members are attached. In this example, three elongated support members of the set of elongated support members form the top end, and the three elongated support members of the set of elongated support members that form the top end are different from the three corresponding elongated support members of the set of elongated support members that are attached to the three attachment regions.

In another example, each given line connection of the plurality of line connections is arranged to allow a corresponding support line to slide freely through an opening in the given line connection. In another example, the support structure includes a set of elongated support members, at least some elongated support members of the set of elongated support members being attached to the connection member, and at least one support line of the plurality of support lines runs externally along one of the at least some elongated support members between the corresponding line connection through which the at least one support line passes and the connection member. In another example, the support structure includes a set of elongated support members, at least some elongated support members of the set of elongated support members being attached to the connection member, and at least one support line of the plurality of support lines runs internally through one of the at least some elongated support members between the corresponding line connection through which the at least one support line passes and the connection member. In another example, the payload assembly includes a tubular structure connected to the connection member and a payload. In another example, there are more tendons of the plurality of support tendons than there are support lines of the plurality of support lines.

BRIEF DESCRIPTION OF THE DRAWINGS

FIGS. 3 and 4 are examples of a balloon in flight in accordance with aspects of the disclosure.

FIGS. 9A-9D are an example of a balloon being launched and pressurized in accordance with aspects of the disclosure.

DETAILED DESCRIPTION

Figure 1:
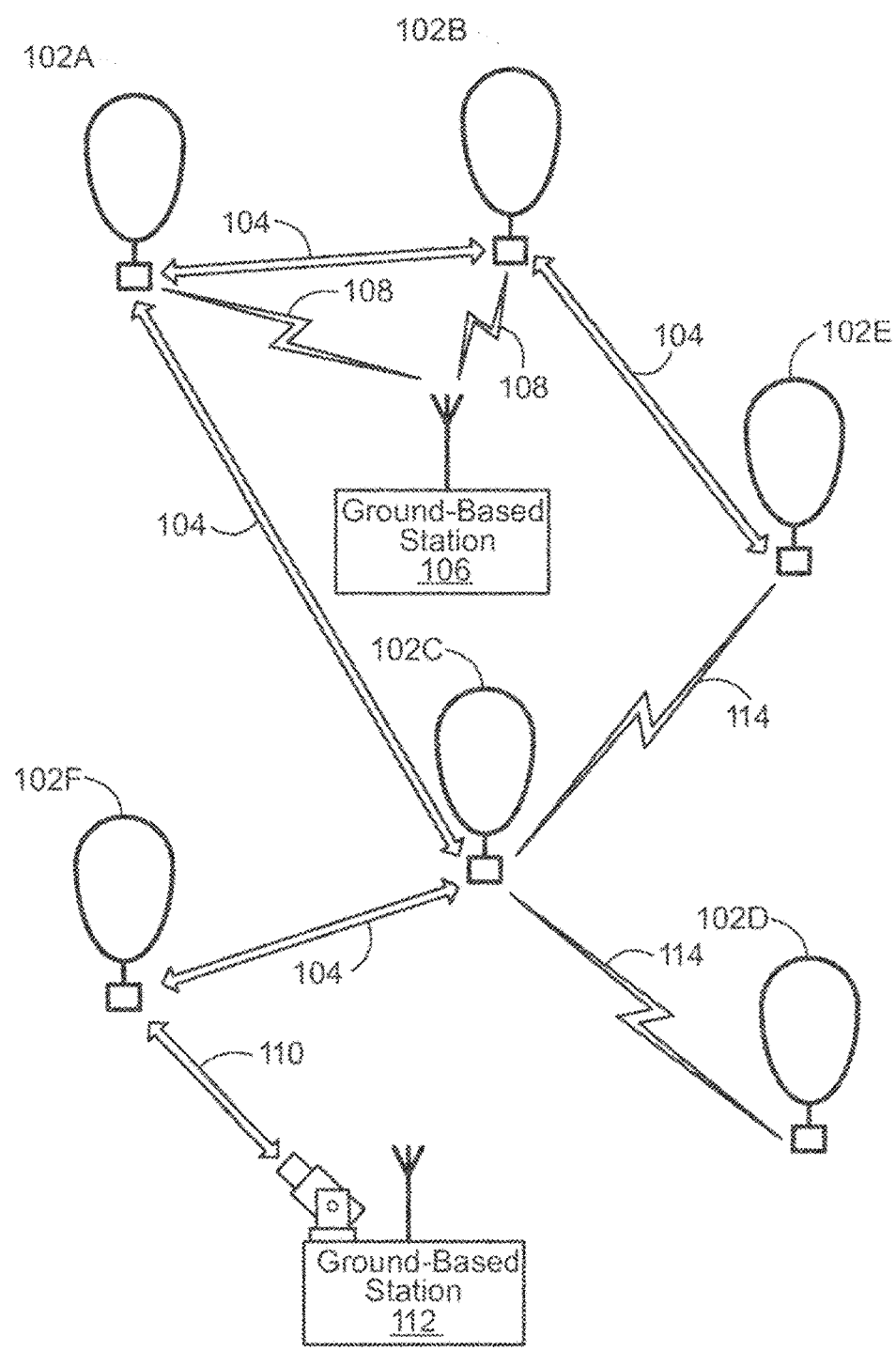
FIG. 1 is a functional diagram of a system in accordance with aspects of the present disclosure.

The present disclosure generally relates to high-altitude balloons such as those used in communication networks. A single network may include a large number of balloons, each of which includes a balloon envelope, a payload including a solar panel, and a cable or other connection between the envelope and the payload. During flight, these balloons may use changes in altitude to achieve navigational direction changes. For example, a balloon may pump air or other gases, that are heavier than the lift gas, into an air ballast. Because the air ballast is free to move within the envelope, inflating the air ballast causes a shift in the center of gravity of the balloon, which in turn, causes the balloon envelope to tilt to one side. In some examples, this balloon tilt can be up to 60 degrees from vertical. If the payload is rigidly connected to the envelope, but of insufficient mass or distance from balloon center of gravity to overcome the tilting moment caused by the ballast air, the balloon tilt will induce a tilt in the payload. Such a tilt may be undesirable for considerations of payload operation or balloon health. This tilt can be mitigated with a sufficiently heavy payload at a sufficient distance from the balloon center of gravity rigidly connected to the envelope. In order to counteract this effect, an anti-tilt apparatus may be used. Such an apparatus must hold the payload rigidly in place relative to the envelope at a distance that is a function of the payload mass.

The anti-tilt apparatus may include a plurality of support lines configured to resist balloon tilt attach the anti-tilt apparatus to the balloon envelope. Each support line may be attached to a tendon of the balloon, for example, by knotting or by clipping an end of a line directly to the tendon or a ring or other structure attached to the tendon. The points of attachment for each support line and tendon may correspond to the equator of the balloon when fully deployed in the stratosphere or at a tangent point on the balloon given the length of the support lines. Alternatively, the support lines may be connected below the equator of the balloon; however, the lower the connection, the lower the degree of tilt the anti-tilt apparatus will be able to counteract.

In addition to the support lines, the anti-tilt apparatus may include a rigid structure that provides torsional stability to the anti-tilt apparatus. The structure may be arranged between the payload and the balloon. As an example, a top of the structure may include structural supports arranged within the same plane. At each corner, an additional support structures may extend downwards toward one another and end at a connection member. In one example, the arrangement of the support structures may form a tetrahedron. In addition, to minimize weight while maximizing rigidity, the support structures may be formed of hollow aluminum, aluminum alloy, or composite tubes.

The connection member may include a bracket having attachment regions for each of the support structures extending from the top of the structure. In addition, the connection member may be configured to attach to a down tube for connecting the support structure to the payload. As an example, the down tube may include a metal shaft which connects the features of the payload to the rigid support.

The support lines may extend from the tendons to corresponding line connections on the rigid structure. As an example, each corner of the top of the support structure may include a pair of line connections such as a loop, tunnel through the rigid structure, or hook through which a corresponding line passes. However, no two lines which are attached to the balloon envelope directly adjacent to one another around the circumference of the balloon are attached to line connections of the same corner. For instance, pairs of support lines are attached to each corner of the support structure, and the support lines of any given pair are attached to tendons located on opposite sides of the balloon envelope from one another. This arrangement provides for the anti-torque capability of the anti-tilt apparatus. Further, as discussed below, the line connections are arranged to allow the support lines to slide within the connections during deployment of the support lines.

The support lines may continue through the line connections along the corresponding downward support structures towards the connection member. The support lines may be arranged internally or externally to the downward support structures. The support lines may then be connected to one or more spools arranged around the connection member. The spools allow the support lines to be wound around the spools and released during launch of a balloon. In this regard, there may be a single spool for all support lines or spools for each of the support lines. Where multiple spools are used, the timing of the release of the support lines may be synchronous or sequential.

The spools may be initially locked and subsequently unlocked at various times and in various sequences in order to release the support lines. For example, the spools may be unlocked prior to the balloon being launched, some period of time after the balloon has been launched, or some period of time after the balloon has been fully pressurized and forms a rounded shape.

When pressurized and during a flight, as noted above, an air ballast may be used to change the altitude of the balloon for navigation purposes. As a byproduct of the air ballast, the balloon may tilt. The anti-tilt assembly causes the payload to resist the tilt tendency induced by the ballast by reacting against the balloon envelope via the support lines. As a result, the anti-tilt assembly is able to counteract the tilting moment of the air ballast by causing one or more of the support lines to pull on the balloon envelope. The initial tilting causes the tension to automatically increase in the lines on the high side of the tilt and decrease in the lines on the low side of the tilt, thereby creating a leveling torque on the balloon envelope. In this regard, the tension in the support line is determined by the mass of the payload assembly, the vertical distance from the balloon, and the tilt angle of the balloon envelope.

The anti-tilt assembly described herein allows for a simple, cost effective and lightweight way to utilize pendulum dynamics to counteract balloon tilt. Counteracting balloon tilt improves balloon health and longevity, reduces likelihood of damage to the components which attach the air ballast to the balloon envelope, and may provide for reliable operation of solar panel and communications equipment of the balloon as well as for other balloons within a balloon network. By arranging the support lines in opposing pairs and offsetting them from the central vertical axis of the balloon envelope, a torsionally-stiff support structure which resists transferring torsional forces between the balloon envelope and the payload can be obtained without adding significant weight to the balloon. In addition, using the entire circumference of the balloon for attachment of the lines at or close to the equator of the balloon, as opposed to a smaller, narrower area, creates a system which hasrobust performance against a broad range of tilt angles. Moreover, the precise parameters of the features described above, lengths, stiffness, placement, etc. can be tuned to produce different results in differently configured balloons.

Aspects, features and advantages of the disclosure will be appreciated when considered with reference to the description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Figure 2:
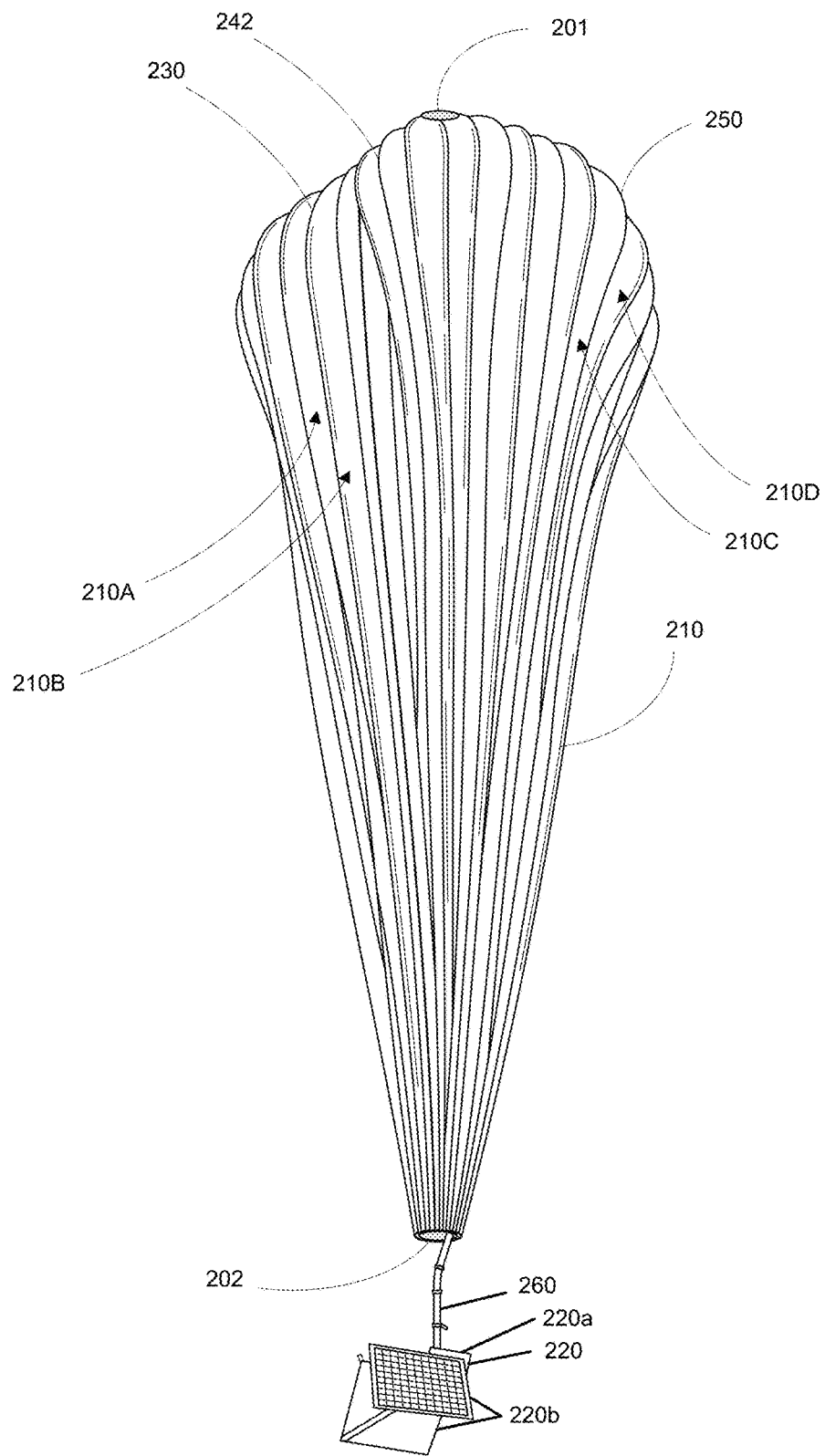
FIG. 2 is an example of a balloon in accordance with aspects of the present disclosure.

FIG. 2 is an example balloon 200, which may represent any of the balloons of balloon network 100. As shown, the balloon 200 includes an envelope 210, a payload assembly 220, including a payload 220a and solar panels 220b, and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a rigid connection 260. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. Bottom ends of the tendons 230, 240 and 250 may also be connected to one another. For example, a corresponding apparatus, e.g., bottom cap 220, may be disposed at a base or bottom of the balloon envelope 210. The top cap 201 at the apex may be the same size and shape as and bottom cap 220 at the bottom. Both caps include corresponding components for attaching the tendons 230, 240 and 250 to the balloon envelope 210.

In order to change the direction of the balloon during flight, each balloon may include an air ballast. The air ballast is free to move within the balloon envelope 210 in order to allow for navigational direction changes. In other words, the air ballast is not arranged in a fixed position within the balloon envelope 210.

FIGS. 3 and 4 are examples of high altitude balloon 200 in flight. In these examples, the shapes and sizes of the balloon envelope 210, connection 260, air ballast 304, and payload 220 are exaggerated for clarity and ease of understanding. In the example of FIG. 3, the balloon 200 is generally in line with the payload 220 via a rigid connection 260. In the example of FIG. 4, a navigational maneuver is accomplished by inflating an air ballast 304 with a gas, such as air, that is heavier than the lift gas. This causes the balloon to descend. Because of the ability of the air ballast to move relatively freely within the balloon envelope, a small amount of air within the air ballast may also cause the balloon envelope 210 to tilt in the direction of the air ballast 304. As can be seen in FIG. 4, the movement of the balloon envelope causes the payload 220 tends to swing in an arc shown by arrow 406, away from the direction of the pull force of the air ballast 304 shown by arrow 408. The heavier the air ballast, the more severe the angle of balloon tilt, or the tilt in the balloon envelope and payload. In order to counteract this effect, an anti-tilt apparatus may be used.

Figure 5:
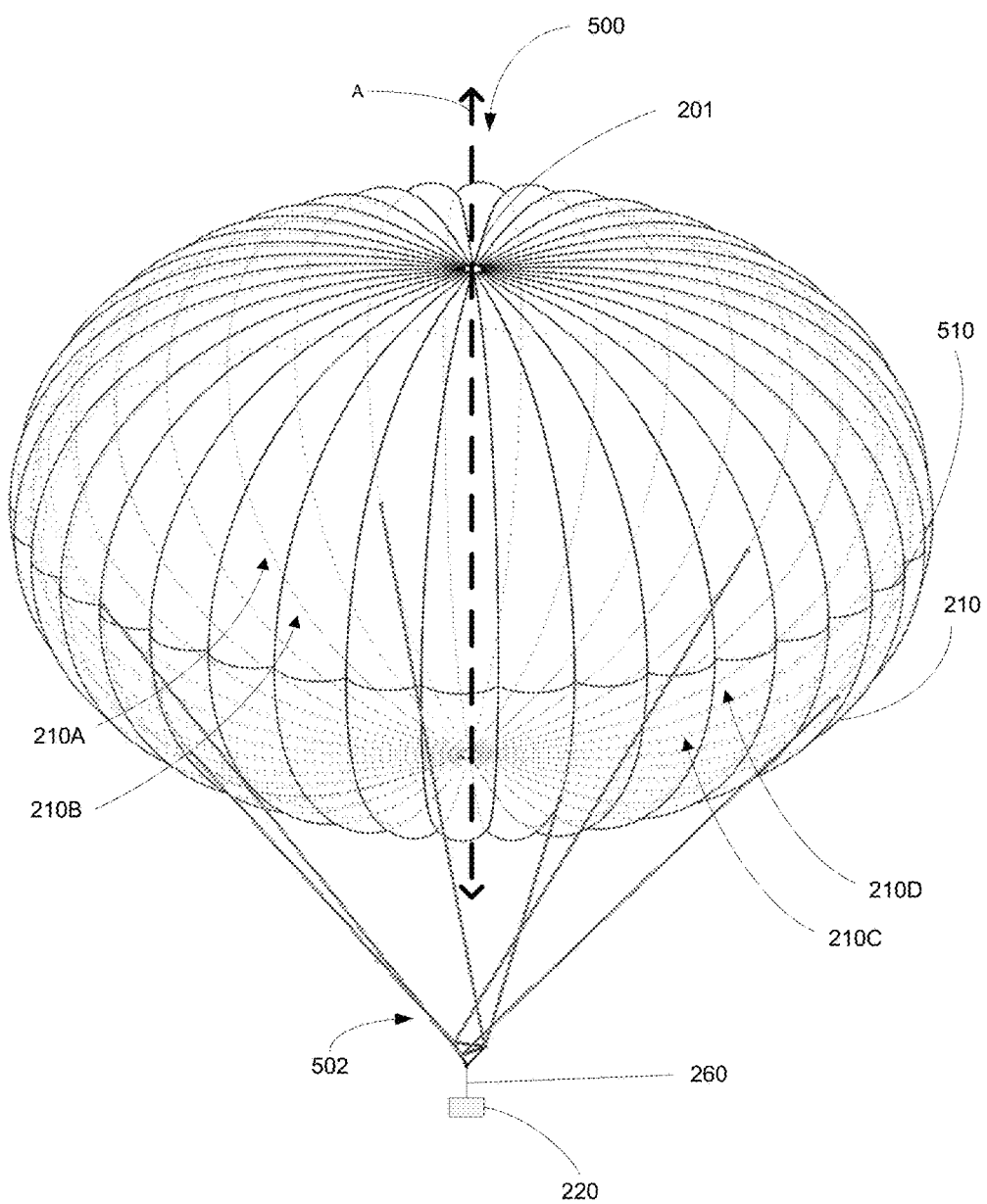
FIG. 5 is another example of a balloon in accordance with aspects of the disclosure.

FIG. 5 is an example of balloon 500 configured similarly to balloon 200, but which includes an anti-tilt apparatus 502. Unlike balloon 200, however, balloon 500 does not include a rigid connection between the balloon envelope and the payload 220 (see, for example, connection 260 of balloon 200 in FIG. 2). Rather, balloon 500 includes a plurality of include a plurality of support lines (identified as support lines 642, 644, 646, 652, 654, 656 in FIGS. 6A and 6B) to attach the anti-tilt apparatus to the balloon envelope. These support line may be made of the same or similar material as the tendons of the balloon, such as carbon fiber or steel, though may have diameters that are significantly smaller than the tendons of the balloon. As an example, each support line may include line configured to support 160 to 300 pounds, such as 200 pound professional kite string.

Each support line 642, 644, 646, 652, 654, 656 may be attached to a tendon of the balloon, for example, by knotting or by clipping an end of a line directly to the tendon or a ring or other structure attached to the tendon. The points of attachment for each line and tendon may correspond to the equator 510 (shown in FIG. 5) of the balloon when fully deployed in the stratosphere or at a tangent point on the balloon given the length of the support lines. As an example, the support lines may be long enough such that the distance between the balloon envelope and the payload assembly is at least 6 to 6.5 meters. The points of attachment for each support line and tendon may correspond to the equator 310 of the balloon when fully pressurized in the stratosphere or at a tangent point on the balloon given the length of the support lines. Alternatively, the support lines may be connected below the equator 310 of the balloon; however, the lower the connection, the lower the degree of tilt the anti-tilt apparatus will be able to counteract.

Figure 8:
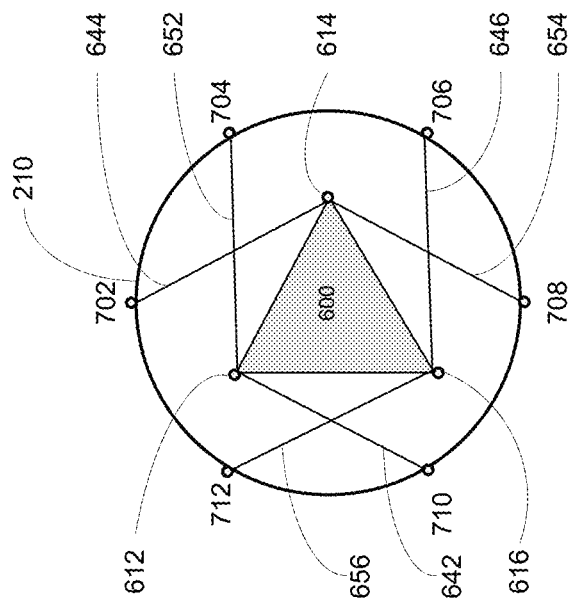
FIGS. 7 and 8 are views of a balloon envelope in accordance with aspects of the disclosure.
Figure 7:
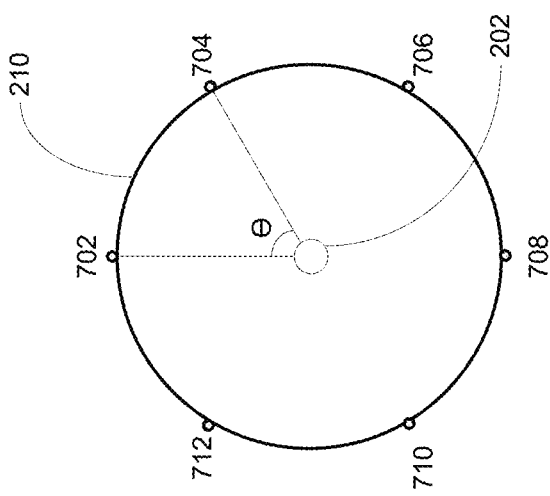

In one example, the six support lines 642, 644, 646, 652, 654, 656 may each be attached to six different tendons spaced generally equally around the circumference of the balloon envelope. FIG. 7 is a bottom up view of a balloon envelope depicting a set of connection points 702, 704, 706, 708, 710, 712 arranged approximately equidistant apart, or at 60 degrees from one another. Each connection point corresponds to a tendon of the balloon, such as tendons 230, 240, and 250 discussed above. FIG. 8 is another bottom up view of the balloon envelope 210 depicting the connections between the connection points 702, 704, 706, 708, 710, 712 of the tendons and the support lines 642, 644, 646, 652, 654, 656. In this example, line 642 is connected to connection point 710, support line 644 is connected to connection point 702, support 646 is connected to connection point 706, support line 652 is connected to connection point 704, support line 654 is connected to connection point 708, and support line 656 is connected to connection point 712. In this example, support lines 642 and 652 form an opposing pair of support lines, or rather, support lines 642 and 652 are connected at connection points that are opposite of one another around the circumference of the balloon envelope. Similarly, support lines 644 and 654 as well as support lines 646 and 656 form opposing pairs of support lines. This arrangement of opposing pairs of support lines that are displayed off of the center axis (A of FIG. 3) of the balloon envelope provides the anti-torque capability of the anti-tilt apparatus.

In addition to the support lines, the anti-tilt apparatus may include a rigid structure that provides torsional stability to the anti-tilt apparatus. Returning to FIG. 6, the anti-tilt apparatus may include a rigid structure 600 arranged between the payload 220 and the balloon envelope 210. Structure 600 provides torsional stability thereby resisting the transfer of torsional forces between the balloon envelope and the payload.

As shown in FIGS. 6 and 8, a top of the structure 600 may include 3 structural supports 602, 604, 606 arranged as a triangle within the same plane. At each corner 612, 614, 616 of the top of the structure, an additional support structure 622, 624, 626 may extend downward towards one another forming an additional three triangles which come together at a connection member 630. Each support structure 602, 604, 606, 622, 624, 626 may have a same or similar length such that the structure 600 forms a regular tetrahedron being, for instance, approximately 20 inches or more or less in length, height, and depth. In addition, to minimize weight while maximizing rigidity, the support structures 602, 604, 606, 622, 624, 626 may be formed of hollow aluminum, aluminum alloy, or composite tubes.

The connection member 630 may include a bracket having three attachment regions 632, 634, 636 for each of the three support structures 622, 624, 626 extending from the top surface. In addition, the connection member 630 may be configured to attach to a down tube (not shown) for connecting the support structure to the payload assembly. As an example, the down tube may include a metal shaft which connects the features of the payload assembly to the structure 600.

The support lines may extend from the tendons to corresponding line connections on the structure 600. As an example, each corner of the top triangle may include a pair of line connections such as a loop, tunnel through the rigid structure, or hook through which a corresponding line passes. Returning to FIG. 8, two of the six lines would pass through line connections for one of the three corners 612, 614, 616 of the top triangle. In this example, line 642 is connected to connection point 710 and one of the two line connections at corner 612. Line 644 is connected to connection point 702 and one of the two line connections at corner 614. Line 646 is connected to connection point 706 and one of the two line connections at corner 616. Line 652 is connected to connection point 704 and one of the two line connections at corner 612. Line 654 is connected to connection point 708 and one of the two line connections at corner 614. Line 656 is connected to connection point 712 and one of the two line connections at corner 616. As can be seen, no two lines which are directly adjacent to one another around the circumference of the balloon are attached to line connections of the same corner as shown in FIG. 8. For instance, the opposing pairs of support lines, 642 and 652, 644 and 654, as well as 646 and 656, are each attached to the line connections of corner of the support structure. This arrangement provides for the anti-torque capability of the anti-tilt apparatus.

Figure 6A:
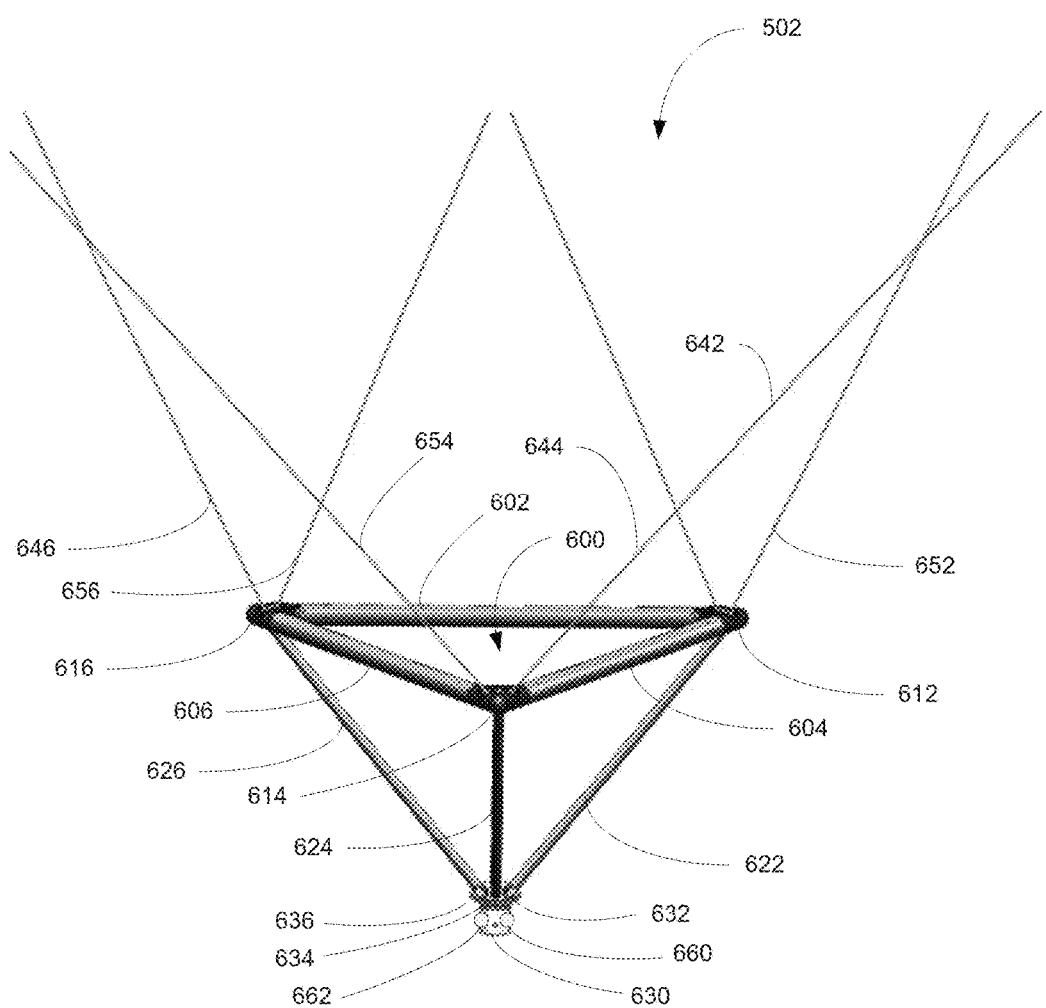
FIGS. 6A and 6B are examples of an anti-tilt assembly in accordance with aspects of the disclosure.
Figure 6B:
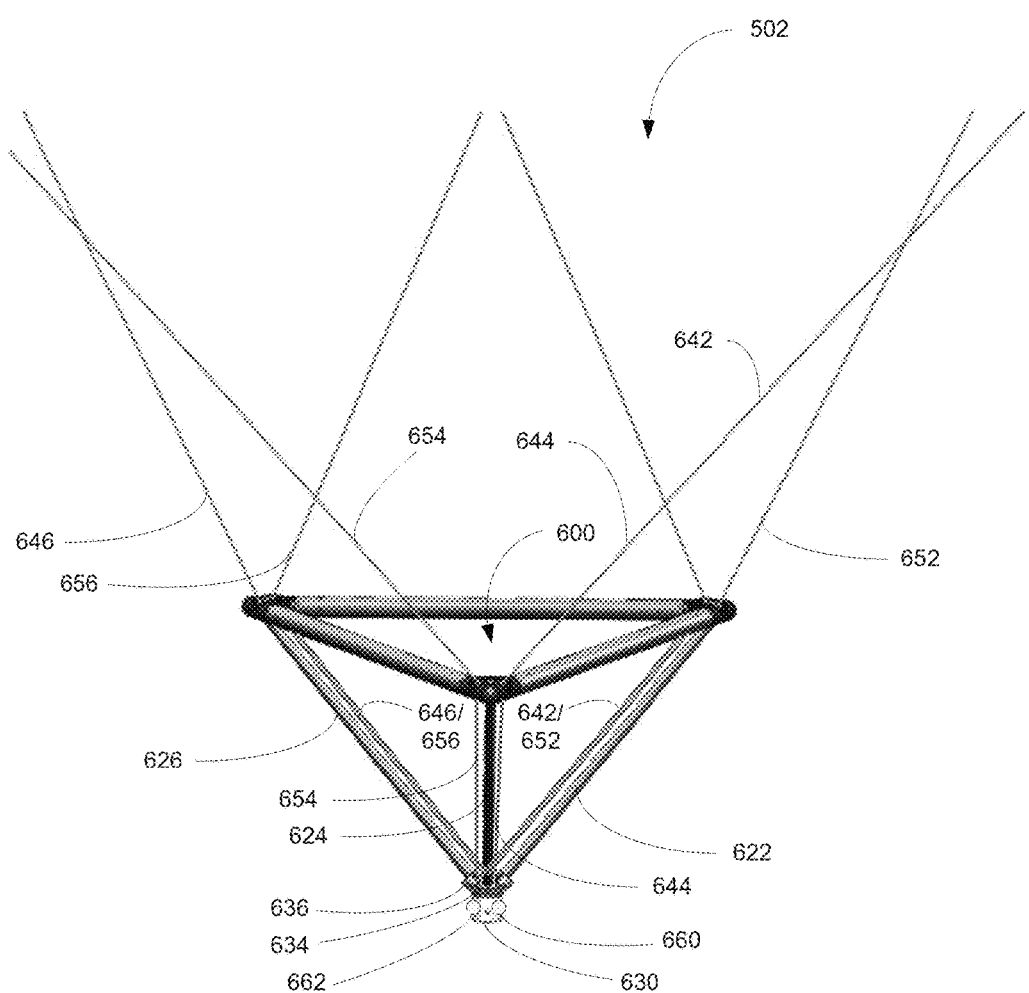

The support lines 642, 644, 646, 652, 654, 656 may continue through the line connections along the corresponding downward support structures towards the connection member 630. The support lines may be arranged internally to, as shown in the example of FIG. 6A, or outside of, as shown in the alternative example of FIG. 6B, to the downward support structures. The support lines may then be connected to one or more spools 660, 662 arranged around the connection member. The spools allow the support lines to be wound around the spools and released during launch of a balloon. In this regard, there may be a single spool for all support lines or spools for each of the support lines.

Figure 9A:
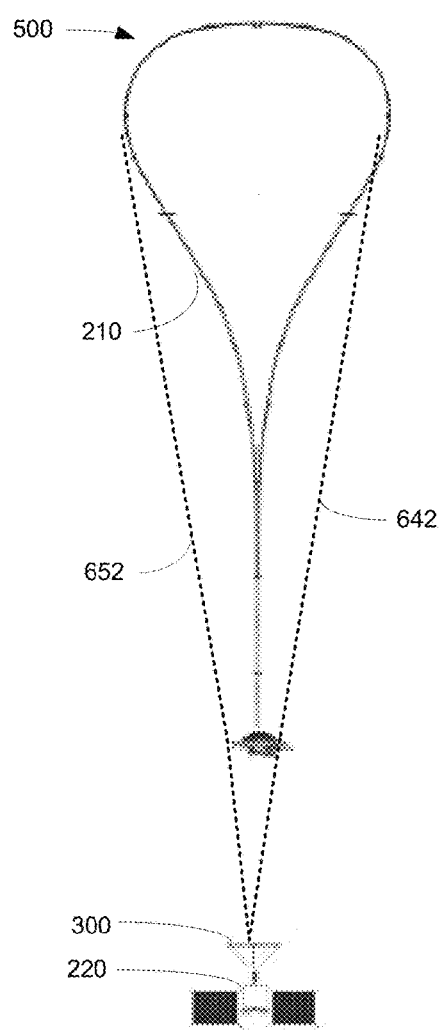
Figure 9B:
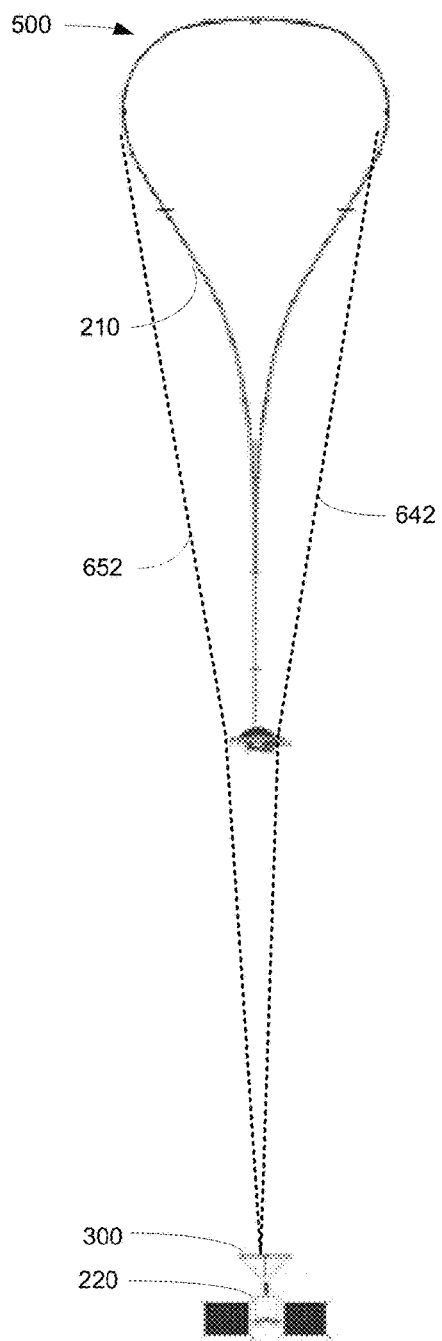

The spools may be initially locked with the support lines would around the spools. The spools may then be unlocked at various times and in various sequences in order to deploy the support lines. In addition, the line connections are arranged to allow the support lines to slide within the connections during deployment of the support lines. FIG. 9A is an example of balloon 500 where balloon envelope 210 is fully inflated by prior to launch. At this point, one or more of the spools may be unlocked. Allowing the balloon envelope to rise or lifting the balloon envelope may cause the support lines to deploy. FIG. 9B is an example of the balloon envelope with the support lines fully deployed. For clarity and ease of understanding, only a single support line is shown; however the additional support lines 644, 646, 652, 654, 656 may be released from the one or more spools at the same or different times.

Alternatively, the balloon may be launched and the one or more spools unlocked at some point afterwards. This may be achieved, for example, by sending an electrical signal from a remote controller having a processor and memory, to a receiver of a locking mechanism of the one or more spools. In one instance, the signal may be sent while the balloon envelope and payload are rising, but prior to pressurization. In this example, the deploying support lines may cause the payload assembly to drop away from the balloon envelope and/or slow the ascent of the payload assembly. In this regard, the deployment of the support lines may occur similarly to the examples of FIGS. 9A and 9B. In another instance, the spools may be unlocked after the balloon is fully pressurized. FIG. 9C is an example of the balloon 500 when the lift gas in the balloon envelope is pressurized after reaching a certain altitude, but prior to the deployment of the support lines. In this example, only two lines are shown for clarity. FIG. 9D is an example of the balloon envelope that is fully pressurized and after the support lines have been deployed.

Figure 10:
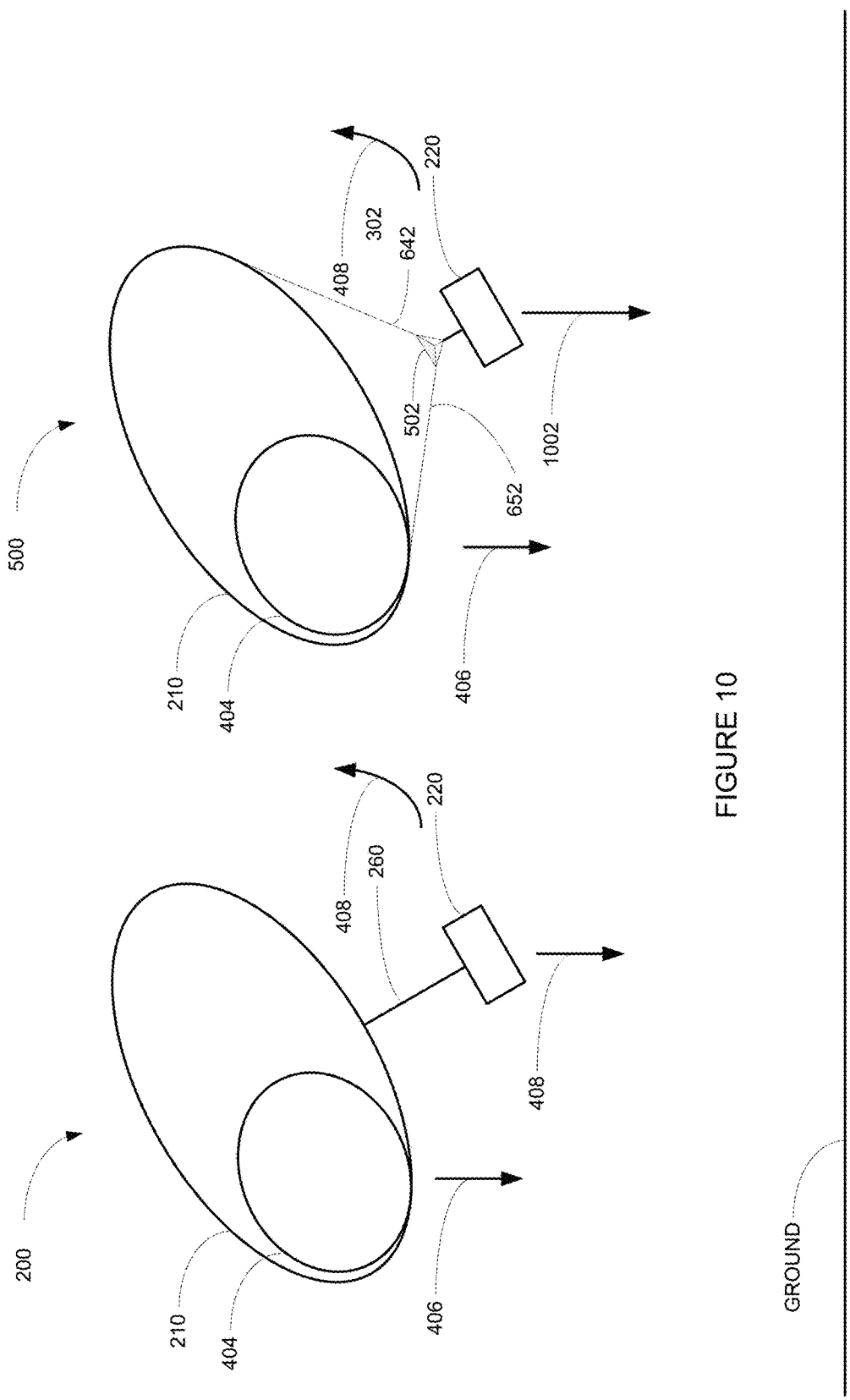
FIG. 10 is an example comparison of balloons in accordance with aspects of the disclosure.

When pressurized and during a flight, as noted above, an air ballast may be used to change the altitude of the balloon for navigation purposes. As noted above, a byproduct of the air ballast, is balloon tilt which may be resisted by the anti-tilt assembly. For example, FIG. 10 depicts a comparison of balloon 200 (without the anti-tilt assembly) and balloon 500 (with the anti-tilt assembly). As discussed above with regard to FIG. 4, when the air ballast 304 of balloon 200 is filled with air or gas that is heavier than the lift gas, the air ballast causes the balloon envelope to tilt. The rigid connection between the payload and the balloon envelope causes the payload assembly to tilt as well. However, when the anti-tilt assembly is used, the initial tilting causes the tension to automatically increase in one or more lines on the high side of the tilt and decrease in one or more lines on the low side of the tilt, thereby creating a leveling torque on the balloon envelope. In other words, as the air ballast 304 of balloon 500 causes the balloon envelope of balloon 500 to tilt, the tilting causes an increase in the tension of the support line 642 (on the high side of the tilt), connected to a tendon which is on an opposing side of balloon envelope relative to the air ballast (on the low side of the tilt which is proximate to support lines 652 in example 10). The weight of the payload is transferred through the structure 600 and support line 642 to the tendon. Thus, the pulling on the tendon causes the balloon envelope of balloon 500 to resist the tilting of the balloon envelope 210 caused by the air ballast 304. In this regard, the tension in the support line is determined by the mass of the payload assembly, the vertical distance from the balloon, and the tilt angle of the balloon envelope.

In addition to including a payload of various computing components and solar panels, the payload assembly may include additional elements for increasing stability of the payload. This may include, for example, a despin mechanism configured to counteract spinning of the payload and to keep solar panels oriented towards the sun. As another example, a flexible knuckle connection may be used to maintain the angle of the payload relative to the ground (or the direction of gravity).

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A balloon comprising:
   a balloon envelope having an air ballast and a plurality of support tendons;
   a payload assembly; and
   an anti-tilt assembly arranged between the balloon envelope and the payload assembly, the anti-tilt assembly including:
      a support structure having a plurality of line connections arranged at a top end of the support structure and a connection member at a bottom end of the support structure, the connection member being attached to the payload assembly, wherein the top end is a triangle;
      a plurality of support lines, each support line of the plurality of support lines being connected at a first end to one of the plurality of support tendons and at a second end to the connection member and being further arranged to pass through a corresponding one of the plurality of line connections, wherein the support lines are spaced apart from one another around the circumference of the balloon and no two adjacent support lines around the circumference of the balloon pass through line connections located at a same corner of the three corners of the triangle.

2. The balloon of claim 1, wherein the support structure includes at least six elongated support members arranged in a tetrahedron.

3. The balloon of claim 1, wherein the triangle is formed from three elongated support members.

4. The balloon of claim 1, wherein exactly two line connections are located at each of three corners of the triangle.

5. The balloon of claim 1, wherein there are exactly six line connections in the plurality of line connections and exactly six support lines.

6. The balloon of claim 1, wherein exactly one of the plurality of support lines is threaded through an opening in the corresponding line connection.

7. The balloon of claim 1, wherein the support structure and the support lines are arranged relative to the balloon envelope in order to counteract a tilting motion of the balloon envelope caused by the air ballast being filled with gas.

8. The balloon of claim 7, wherein the plurality of support lines are attached at different attachment points around a circumference of the balloon such that when the air ballast is filled with air and causes the balloon envelope to tilt, at least one of the plurality of support structures allows the payload to pull against the balloon envelope and resist the tilting motion.

9. The balloon of claim 1, wherein the plurality of support lines and the plurality of support tendons are comprised of a same material.

10. The balloon of claim 1, wherein the plurality of support lines have diameters smaller than diameters of the plurality of support tendons.

11. The balloon of claim 1, wherein the connection member includes a spool configured to hold the plurality of support lines prior to launch of the balloon.

12. The balloon of claim 1, wherein the connection member includes a corresponding spool for each of the plurality of support lines such that each corresponding spool is configured to hold a given one of the plurality of support lines prior to launch of the balloon.

13. The balloon of claim 1, wherein the support structure is comprised of a set of elongated support members and the connection member includes a bracket having three attachment regions at which three corresponding elongated support members of the set of elongated support members are attached.

14. The balloon of claim 13, wherein three elongated support members of the set of elongated support members form the top end, and the three elongated support members of the set of elongated support members that form the top end are different from the three corresponding elongated support members of the set of elongated support members that are attached to the three attachment regions.

15. The balloon of claim 1, wherein each given line connection of the plurality of line connections is arranged to allow a corresponding support line to slide freely through an opening in the given line connection.

16. The balloon of claim 1, wherein the support structure includes a set of elongated support members, at least some elongated support members of the set of elongated support members being attached to the connection member, and wherein at least one support line of the plurality of support lines runs externally along one of the at least some elongated support members between the connection member and the corresponding line connection through which the at least one support line passes.

17. The balloon of claim 1, wherein the support structure includes a set of elongated support members, at least some elongated support members of the set of elongated support members being attached to the connection member, and wherein at least one support line of the plurality of support lines runs internally through one of the at least some elongated support members between the connection member and the corresponding line connection through which the at least one support line passes.

18. The balloon of claim 1, wherein the payload assembly includes a tubular structure connected to the connection member and a payload.

19. The balloon of claim 1, wherein there are more tendons of the plurality of support tendons than there are support lines of the plurality of support lines.

* * * * *